United States Patent
Chen et al.

(12)

(10) Patent No.: US 12,393,469 B2
(45) Date of Patent: Aug. 19, 2025

(54) VEHICLE CONTROL MODULE ALLOCATION

(71) Applicant: Ford Global Technologies, LLC, Dearborn, MI (US)

(72) Inventors: Kexun Chen, Canton, MI (US); Abdullah Ali Husain, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 564 days.

(21) Appl. No.: 17/814,890

(22) Filed: Jul. 26, 2022

(65) Prior Publication Data

US 2024/0036943 A1  Feb. 1, 2024

(51) Int. Cl.
*G06F 9/46* (2006.01)
*G06F 9/38* (2018.01)
*G06F 9/50* (2006.01)
*G06F 9/52* (2006.01)

(52) U.S. Cl.
CPC ............. *G06F 9/52* (2013.01); *G06F 9/3838* (2013.01); *G06F 9/5038* (2013.01)

(58) Field of Classification Search
CPC ......... G06F 9/52; G06F 9/3838; G06F 9/5038
See application file for complete search history.

(56) References Cited

U.S. PATENT DOCUMENTS

| | | | |
|---|---|---|---|
| 11,194,570 B2 | 12/2021 | Fox | |
| 2009/0016220 A1* | 1/2009 | Uysal | H04L 41/5009 370/232 |
| 2017/0277607 A1* | 9/2017 | Samii | G06F 11/2033 |
| 2018/0295011 A1 | 10/2018 | Wang et al. | |
| 2021/0034412 A1* | 2/2021 | Televitckiy | G05D 1/0088 |
| 2021/0150829 A1 | 5/2021 | Lee et al. | |
| 2021/0407220 A1 | 12/2021 | Fang et al. | |
| 2023/0053933 A1* | 2/2023 | Christidis | G06F 9/546 |
| 2024/0004715 A1* | 1/2024 | Bai | G06F 9/5072 |

\* cited by examiner

*Primary Examiner* — Gregory A Kessler
(74) *Attorney, Agent, or Firm* — Christopher Storms; Brooks Kushman P.C.

(57) ABSTRACT

A vehicle system includes a master controller, a plurality of control modules, and a vehicle network communicatively coupling the master controller and the control modules. The master controller is programmed to receive a set of dependencies between a plurality of applications, receive resource limitations for the control modules, and allocate the applications to the control modules based on the dependencies and the resource limitations.

19 Claims, 6 Drawing Sheets

VEHICLE CONTROL MODULE ALLOCATION

BACKGROUND

Modern vehicles typically include control modules. The control modules are distinct computing devices. The control modules can be programmed for performing different functions for the vehicle. Typical control modules on board a vehicle include an engine control module, a body control module, a restraint control module, an accessory control module, a power-steering control module, an antilock brake control module, etc. The vehicle may contain between fifty and one hundred control modules.

DETAILED DESCRIPTION

Figure 1:
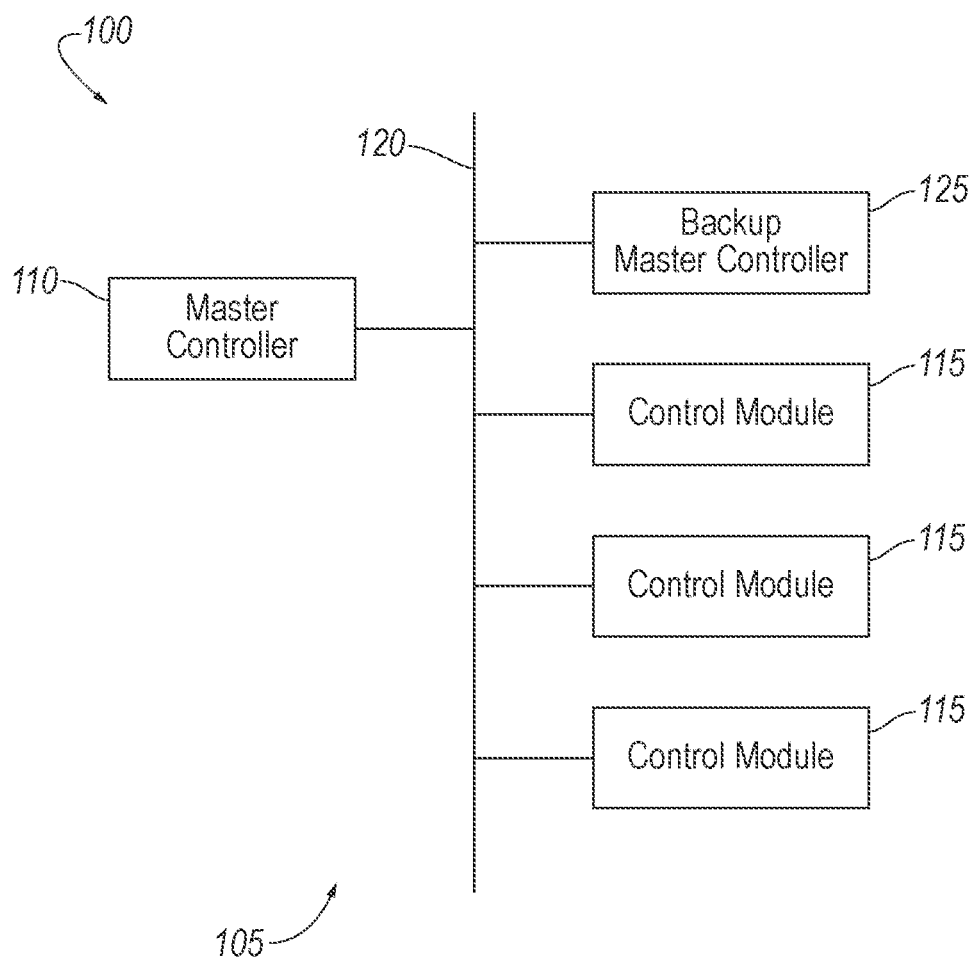
FIG. 1 is a block diagram of an example vehicle.

Systems and techniques are provided for allocating applications to control modules on board a vehicle. The allocation can deviate from a default allocation in order to address resource limitations of the control modules, e.g., when a subset of the control modules is unavailable. The allocation relies on a set of dependencies. A dependency is a relationship between two applications in which a first application is used by a second application or is otherwise necessary for executing the second application. In particular, a master controller from the control modules can be programmed to receive a set of dependencies between a plurality of applications, receive resource limitations for a plurality of control modules on board a vehicle, and allocate the applications to the control modules based on the dependencies and the resource limitations. This allocation provides for reliable operation of the applications, e.g., by providing a maximum utilization of the resources of the control modules and by preserving the operation of applications that are necessary for other applications.

The dependencies are distinct from a prioritization of applications. The prioritization may indicate which applications to retain and which to drop in case the control modules contain insufficient resources to handle all the applications, and the master controller may use the prioritization of the applications in addition to the set of dependencies to allocate the applications. Using the set of dependencies can enhance the efficiency, e.g., by allocating applications having a dependent relationship to the same control module or to control modules in close communication.

A vehicle system includes a master controller, a plurality of control modules, and a vehicle network communicatively coupling the master controller and the control modules. The master controller is programmed to receive a set of dependencies between a plurality of applications, receive resource limitations for the control modules, and allocate the applications to the control modules based on the dependencies and the resource limitations.

The vehicle system may further include a backup master controller, and the backup master controller may be programmed to, upon determining that the master controller is unavailable, determine the set of the dependencies between the applications, receive the resource limitations for the control modules, and allocate the applications to the control modules based on the dependencies and the resource limitations.

The control modules may include a first control module, and the first control module may be programmed to, upon determining that the master controller is unavailable, determine the set of the dependencies between the applications, receive the resource limitations for the control modules, and allocate the applications to the control modules based on the dependencies and the resource limitations.

The master controller may be further programmed to transmit respective queries to the control modules, and the control modules may be programmed to transmit respective responses in response to receiving the respective queries. The master controller may be further programmed to update the resource limitations based on the responses from the control modules.

A computer includes a processor and a memory, and the memory stores instructions executable to receive a set of dependencies between a plurality of applications, receive resource limitations for a plurality of control modules on board a vehicle, and allocate the applications to the control modules based on the dependencies and the resource limitations.

When allocating the applications to the control modules, the applications may be taken from a queue. The instructions may further include instructions to, upon determining that a first control module of the control modules is unavailable, put the applications that are allocated to the first control module into the queue. The instructions may further include instructions to determine that the first control module is unavailable based on the first control module being offline.

The instructions may further include instructions to determine that the first control module is unavailable based on the first control module currently receiving an update.

The instructions may further include instructions to determine that the first control module is unavailable based on the vehicle entering a power-conservation state.

The applications in the queue may have respective priorities, and allocating the applications to the control modules may be performed in an order based on the priorities.

The applications may include a first application and a second application, the set of dependencies may include that the first application is dependent on the second application, and allocating the applications may include allocating the first application and the second application to a same control module of the control modules.

The instructions may further include instructions to, upon determining that a first control module of the control modules is unavailable, update the resource limitations. The instructions may further include instructions to transmit respective queries to the control modules, and to determine that the first control module is unavailable based on the queries.

The applications may be containerized.

Receiving the set of the dependencies may include receiving the set of the dependencies from a server remote from the vehicle.

The instructions may further include instructions to receive a default allocation of the applications to the control modules from a server remote from the vehicle, and allocate the applications to the control modules according to the default allocation. Allocating the applications to the control modules based on the dependencies and the resource limitations may include allocating the applications differently than the default allocation.

A method includes receiving a set of dependencies between a plurality of applications, receiving resource limitations for a plurality of control modules on board a vehicle, and allocating the applications to the control modules based on the dependencies and the resource limitations.

With reference to the Figures, wherein like numerals indicate like parts throughout the several views, a vehicle system 105 of a vehicle 100 includes a master controller 110, a plurality of control modules 115, and a vehicle network 120 communicatively coupling the master controller 110 and the control modules 115. The master controller 110 is programmed to receive a set of dependencies between a plurality of applications, receive resource limitations for the control modules 115, and allocate the applications to the control modules 115 based on the dependencies and the resource limitations.

With reference to FIG. 1, the vehicle 100 may be any passenger or commercial automobile such as a car, a truck, a sport utility vehicle, a crossover, a van, a minivan, a taxi, a bus, etc.

The master controller 110 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The master controller 110 can thus include a processor, a memory, etc. The memory of the master controller 110 can include media for storing instructions executable by the processor as well as for electronically storing data and/or databases, and/or the master controller 110 can include structures such as the foregoing by which programming is provided.

The master controller 110 may transmit and receive data through a vehicle network 120 such as a controller area network (CAN) bus, Ethernet, WiFi, Local Interconnect Network (LIN), onboard diagnostics connector (OBD-II), and/or by any other wired or wireless communications network. The master controller 110 may be communicatively coupled to the control modules 115, a backup master controller 125, and other components via the vehicle network 120.

The control modules 115 are microprocessor-based computing devices, e.g., generic computing devices including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. Each control module 115 can thus include a processor, a memory, etc. The memory of each control module 115 can include media for storing instructions executable by the processor as well as for electronically storing data and/or databases, and/or the control module 115 can include structures such as the foregoing by which programming is provided.

The control modules 115 can be programmed for performing different functions for the vehicle 100. For example, the control modules 115 can include an engine control module, a body control module, a restraint control module, an accessory control module, a power-steering control module, an antilock brake control module, etc. The vehicle 100 may contain between fifty and one hundred control modules 115.

The vehicle system 105 may include the backup master controller 125. One of the control modules 115 may be the backup master controller 125. The backup master controller 125 may include the programming described below that is programmed on the master controller 110. The master controller 110 and the backup master controller 125 may each have greater processing power than any of the other control modules 115, in order to handle the programming described below. The backup master controller 125 may also serve as one of the control modules 115, and the steps described below with respect to the control modules 115 also apply to the backup master controller 125.

The applications are executed on the control modules 115. The applications can control features of the vehicle 100. For example, applications can determine a braking force based on a position of a brake pedal, shift gears based on a revolutions per minute of an engine, determine a torque applied by an electric power assist steering (EPAS) actuator, pair an infotainment system with a mobile device of an operator, etc. The applications can serve as drivers for components of the vehicle 100, i.e., can provide a software interface for the components. The components can be sensors such as cameras, radars, ultrasonic sensors, inertial measurement units, temperature sensors, GPS sensors, wheel-speed sensors, etc.; actuatable components such as brake actuators, the EPAS actuator, windshield wipers, headlights, etc.; user interface components such as screens and displays, speakers, microphones, etc.; or other types of components.

The applications may be containerized. Containerization means the packaging of software code, in this case one of the applications, with just the operating system libraries and other necessary software for the software code to execute, so that the containerized application can be deployed to different computing environments. Containerization permits the applications to be allocated to different control modules 115 than the default allocation.

The set of the dependencies is a set of relationships between the applications in which one of the applications is dependent on another of the applications. A first application being dependent on a second application means that the second application provides something necessary or important for execution of the first application. For example, an application for determining the braking force can be dependent on a driver for a position sensor on the brake pedal, a driver for a brake actuator, and an antilock braking application. The antilock braking application, in turn, can be dependent on drivers for other sensors that can detect whether one of the wheels is losing traction.

The applications can have respective priorities. The priorities can represent a rank ordering of the importance of the applications to operating the vehicle 100. For example, applications related to braking can have a higher priority than applications related to a climate-control system. The prioritization can include tiers, i.e., sets of applications with the same value for priority. The prioritization can be dependent on a mode of operation of the vehicle 100, e.g., applications can have different priorities when the vehicle 100 is in a power-conservation mode than in a standard-driving mode.

The control modules 115 can be subject to resource limitations. For the purposes of this disclosure, a resource limitation for a control module 115 is a state of operating at less than full processing capacity. The full processing capacity is dictated by the hardware of the control module 115 and may be different for different control modules 115. For example, the resource limitation can be that the control module 115 is unavailable. A control module 115 may be unavailable because the control module 115 is offline, because the control module 115 has been shut down to conserve energy on board the vehicle 100, because the control module 115 is receiving and installing a software update, or because of some other reason. For another example, the control module 115 may be operable at a reduced processing capacity, e.g., if the control module 115 is at a high temperature.

The master controller 110 can track the resource limitations in a resource map. The resource map may include a status of each control module 115. The status can indicate the resource limitations, if any, affecting the control module 115. For example, the status can include a score from 0 to 1, in which 0 indicates that the control module 115 is unavailable, 1 indicates that the control module 115 has full processing capacity, and a value between 0 and 1 indicates a reduced processing capacity as a fraction of the full processing capacity. The status may further include an effective processing capacity for the control module 115, which can be the status score multiplied by the full processing capacity, meaning that the effective processing capacity incorporates any resource limitations. The resource map may also track how much of the effective processing capacity for each control module 115 is occupied by applications already allocated to that control module 115, as well as other factors affecting the ability of the control modules 115 to execute applications such as power consumption and latency.

Figure 2A:
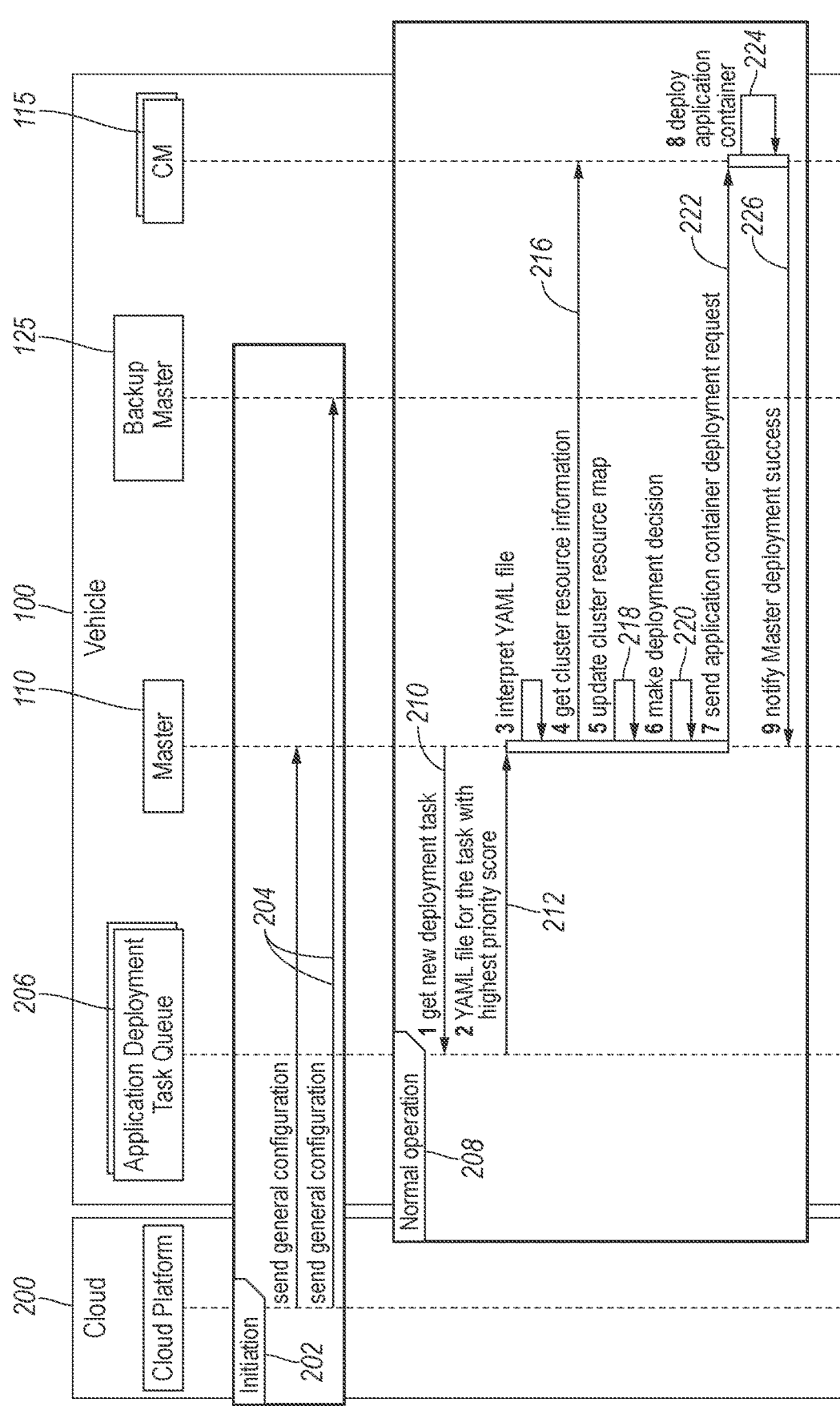
FIG. 2A is a sequence diagram of an example process for allocating applications to control modules of the vehicle under normal operation.

With reference to FIG. 2A, during an initiation mode 202, a server 200 remote from the vehicle 100 may be programmed to transmit a configuration file to the master controller 110 on board the vehicle 100, and the master controller 110 is programmed to receive the configuration file. The server 200 transmits the configuration file to both the master controller 110 and the backup master controller 125 as a step 204. The configuration file may include the set of dependencies and a default allocation of the applications. The default allocation of the applications is the allocation when no resource limitations are present. The configuration file may also include the priorities as discussed above and may also include other requirements. The other requirements are limitations on which control modules 115 that a given application can be assigned to. For example, some applications may only be assigned to a control module 115 having a graphics processing unit (GPU).

One of the control modules 115, e.g., the master controller 110, may include a queue 206 stored in memory. The queue 206 stores identifications of applications needing to be reassigned, e.g., if the applications had been operating on control module 115 that became subject to a resource limitation.

In a normal-operation mode 208, the master controller 110 may be programmed to request identification of a next application to be allocated, in a step 210. The identified application can be taken from the queue 206. Next, in a step 212, the master controller 110 receives an identification of an application from the queue 206, e.g., the application in the queue 206 having the highest value for priority. Allocating the applications to the control modules 115 may therefore be performed in an order based on the priorities, with higher-priority applications allocated in the manner described below before lower-priority applications are allocated. The master controller 110 may also receive a set of the dependencies involving the identified application and any constraints that apply to the identified application, e.g., stored in a YAML file. The constraints may be a listing of which control modules 115 are eligible and which are ineligible for that application. Next, in a step 214, the master controller 110 interprets the set of dependencies, e.g., parses the YAML file. Next, in a step 216, the master controller 110 acquires the statuses, including the resource limitations if any, of the control modules 115 (including the backup master controller 125 in its status as a control module 115). Next, in a step 218, the master controller 110 updates the resource map based on the statuses. Next, in a step 220, the master controller 110 determines how to allocate the application, i.e., selects a control module 115 to which to allocate the application, as will be described in more detail below. Next, in a step 222, the master controller 110 allocates the application to the selected control module 115. Next, in a step 224, the selected control module 115 deploys the application, i.e., begins executing the application, e.g., the containerized application including the application and the other necessary libraries for the application. Next, in a step 226, the selected control module 115 notifies the master controller 110 that the deployment of the application is successful.

Determining how to allocate the application in step 220 is based in part on the dependencies. For example, if a first application depends on a second application, the master controller 110 may allocate the first and second applications to control modules 115 that are as close together as permitted by the resource limitations and/or other criteria, e.g., to the same control module 115. Closeness can be measured in terms of a number of nodes along a communication path through the vehicle network 120 from one control module 115 to the other, e.g., 0 for the same control module 115, 1 for control modules 115 on a same subnetwork of the vehicle network 120, 2 for control modules 115 on different subnetworks of the vehicle network 120 connected by a single gateway module, etc.

Determining how to allocate the application in step 220 is based in part on the resource limitations. For example, the master controller 110 may allocate an application as close to a default control module 115 as the resource limitations permit. The default control module 115 is the control module 115 to which the application is assigned in the default allocation. For example, the master controller 110 can allocate the application to the default control module 115 if the default control module 115 has an unallocated effective processing capacity greater than a processing demand of the application, otherwise to a control module 115 on the same subnetwork as the default control module 115 if at least one control module 115 on that subnetwork has an unallocated effective processing capacity greater than the processing demand, etc. Allocating the applications to the control modules 115 based on the dependencies and the resource limitations may therefore include allocating the applications differently than the default allocation.

Determining how to allocate the application in step 220 may be based in part on other criteria, e.g., balanced resource consumption among the available control modules 115 or the other requirement for applications described above, and determining how to allocate the application in step 220 may be based on other factors, such as power consumption, latency, and other characteristics affecting quality of service.

Figure 2B:
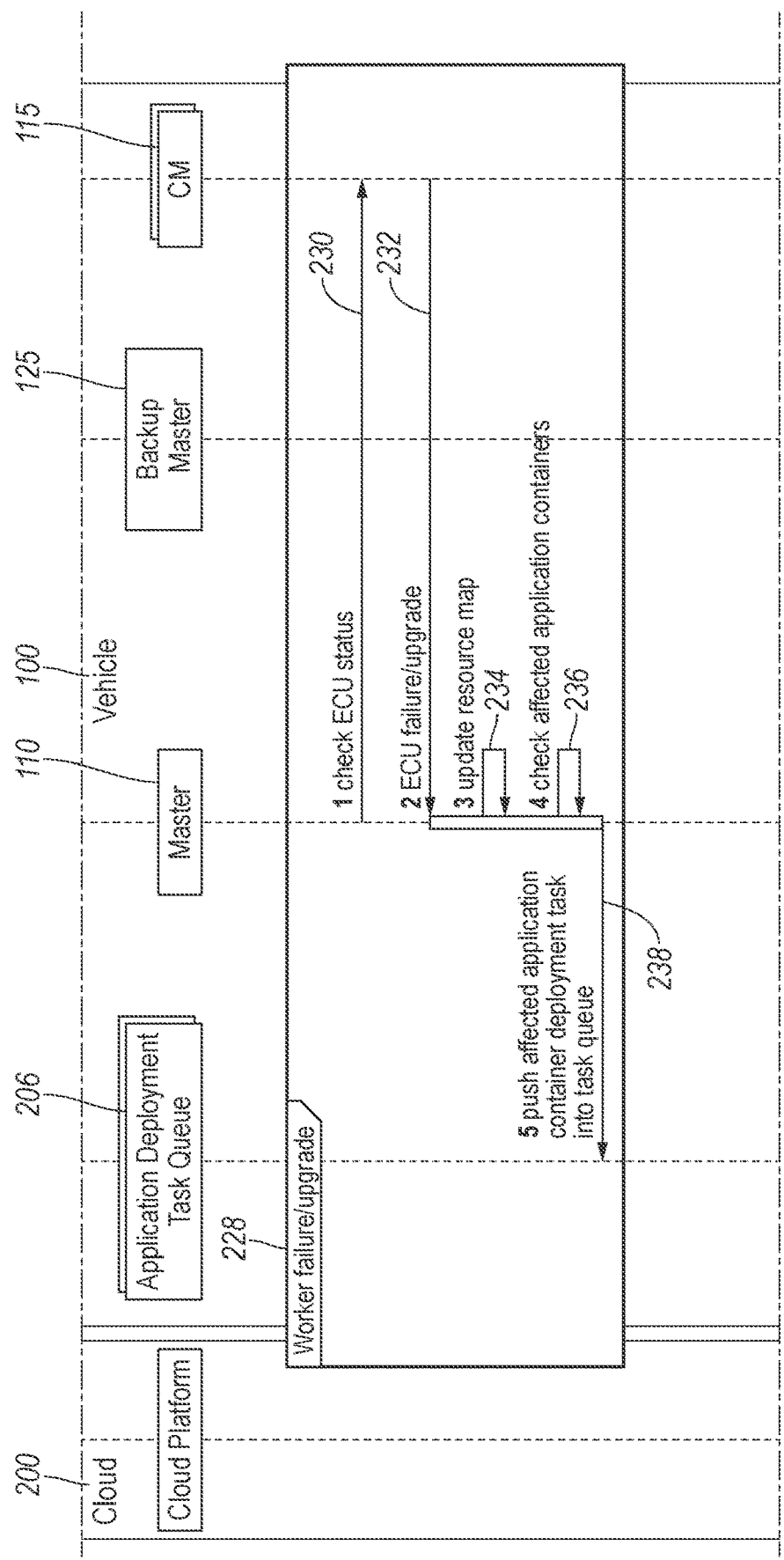
FIG. 2B is a sequence diagram of an example process for allocating the applications to the control modules in case of unavailability of one of the control modules.

With reference to FIG. 2B, in an unavailability mode 228, the master controller 110 may transmit queries to the control modules 115 in a step 230. The queries can be messages requesting that the control modules 115 report their statuses, e.g., a presence or absence of a resource limitation and, if present, the extent of a resource limitation, i.e., the effective processing capacity of the control module 115. Next, in a step 232, the control modules 115 that are available with at least a reduced processing capacity transmit responses back to the master controller 110 (including the backup master controller 125 in its status as a control module 115). Each response may include the status of the control module 115 as well as resource consumption by applications allocated to the control module 115, power consumption by the control module 115, and latency. Next, in a step 234, the master controller 110 updates the resource map based on the queries. The master controller 110 can include statuses of the control modules 115 as full processing capacity, an extent of reduced processing capacity, or unavailable based on the responses, and the master controller 110 can also include statuses of the control modules 115 as unavailable based on the lack of a response within a time threshold. The statuses can include the effective processing capacities of the control modules 115. The time threshold may be based on a normal time to send the query and receive the response. Next, in a step 236, the master controller 110 identifies the applications that are currently allocated to control modules 115 subject to resource limitations, e.g., that are unavailable or have reduced processing capacity. Next, in a step 238, the master controller 110 adds the applications identified in the step 236 to the queue 206.

Unavailability of one of the control modules 115 may be caused by a variety of events. For example, the master controller 110 may determine that a control module 115 is unavailable based on the control module 115 being offline, e.g., by not receiving a response within the time threshold after sending the query. The control module 115 may be offline because the control module 115 has experienced a fault, has been removed from the vehicle 100, etc. For another example, the master controller 110 may determine that a control module 115 is unavailable based on the control module 115 currently receiving an update, e.g., a software upgrade. The response to the query may indicate that the control module 115 is currently undergoing the update. For another example, the master controller 110 may determine that a control module 115 is unavailable based on the vehicle 100 entering a power-conservation state. The vehicle 100 may enter the power-conservation state in response to a charge level of a high-voltage battery of the vehicle 100 decreasing below a charge threshold, e.g., if the vehicle 100 is a battery electric vehicle. The master controller 110 may receive a message from, e.g., a control module 115 responsible for power management, indicating the control modules 115 that are unavailable to conserve power. Alternatively or additionally, the control module 115 responsible or power management may transmit message to the control modules 115 that will be unavailable to conserve power, and the responses to the queries from those control modules 115 may indicate that the control modules 115 are unavailable to conserve power.

Figure 2C:
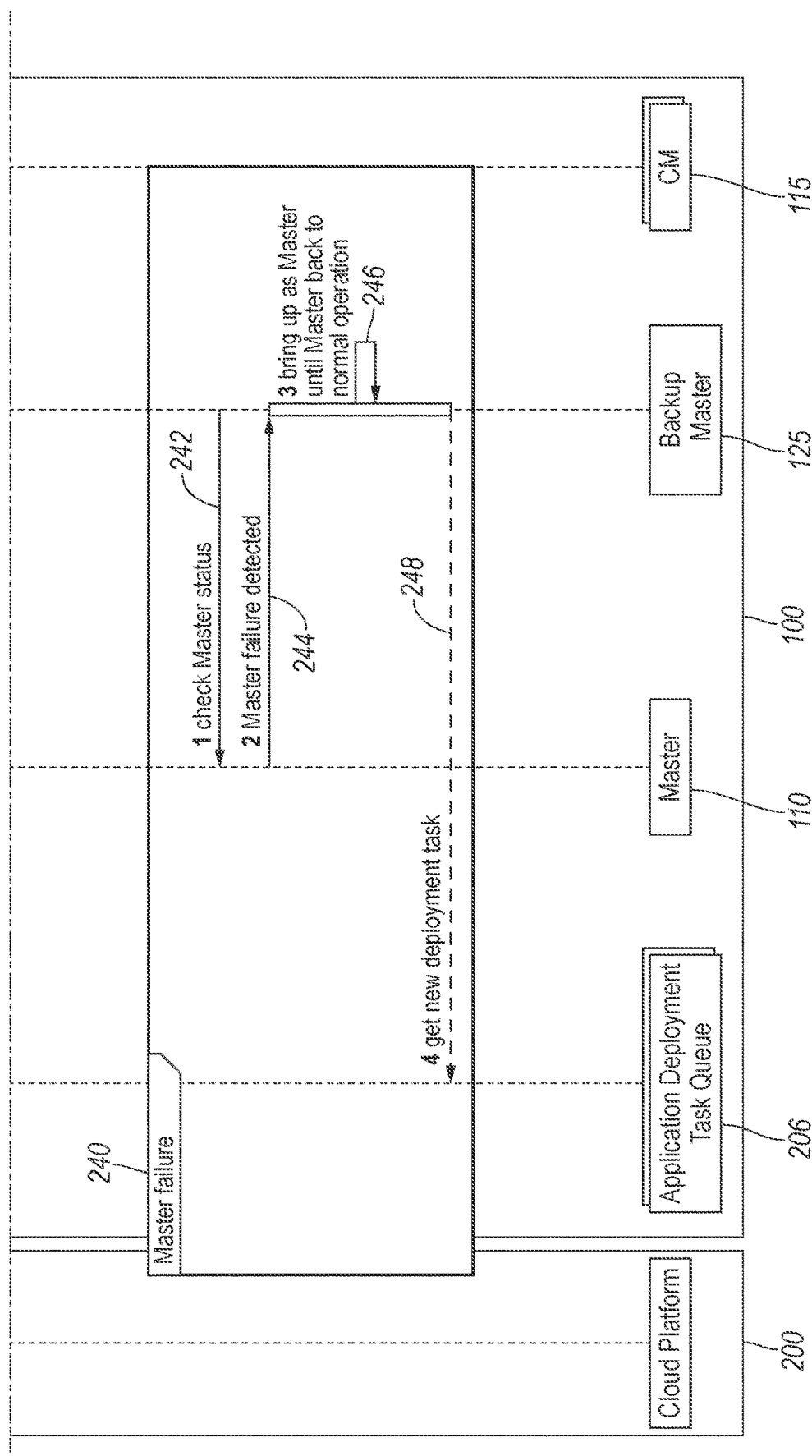
FIG. 2C is a sequence diagram of an example process for allocating the applications to the control modules in case of unavailability of a master controller of the vehicle.

With reference to FIG. 2C, in a master-unavailability mode 240, the backup master controller 125 transmits a query to the master controller 110 in a step 242. The query can be a message requesting that the master controller 110 report a status, e.g., available or unavailable. Next, in a step 244, the backup master controller 125 determines that the master controller 110 is unavailable, e.g., by not receiving a response from the master controller 110 within the time threshold or by receiving a response indicating that the master controller 110 is unavailable, e.g., as described above for the control modules 115. Next, in a step 246, the backup master controller 125 acts as the master controller 110, i.e., performs the steps described above for the master controller 110 in the normal-operation mode 208 and the unavailability mode 228, e.g., receiving an identification of an application in the queue 206 in a step 248, and so on. While doing so, the backup master controller 125 periodically transmits the query and ceases acting as the master controller 110 upon receiving a response from the master controller 110 indicating that the master controller 110 has become available.

Figure 3:
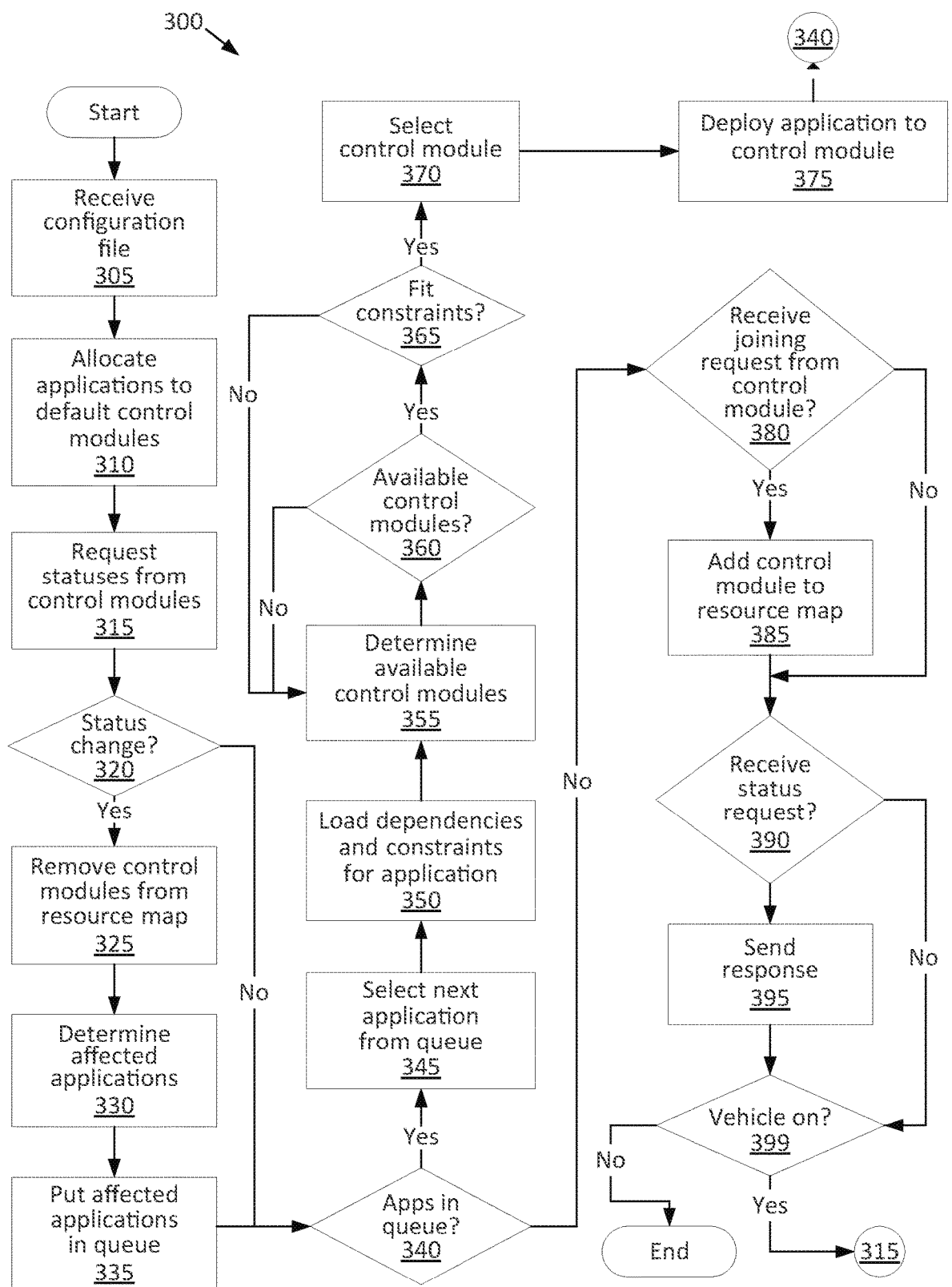
FIG. 3 is a process flow diagram of an example process for the master controller to allocate the applications to the control modules.

FIG. 3 is a process flow diagram illustrating an example process 300 for the master controller 110 to allocate the applications to the control modules 115. The memory of the master controller 110 stores executable instructions for performing the steps of the process 300 and/or programming can be implemented in structures such as mentioned above. The process 300 begins when the vehicle 100 is turned on. As a general overview of the process 300, the master controller 110 receives the configuration file, allocates the applications to the control modules 115 according to the default allocation, and transmits queries to the control modules 115. Upon determining that one of the control modules 115 is subject to a resource limitation, the master controller 110 updates the resource map, identifies the applications on that control module 115, and puts those applications in the queue 206. When applications are in the queue 206, for each application, the master controller 110 determines the dependencies for the application, determines an available control module 115 that fits the dependencies and constraints of the application, and allocates the application to the available control module 115. Upon receiving a request from a previously unavailable control module 115, the master controller 110 updates the resource map with that control module 115. Upon receiving a query from the backup master controller 125, the master controller 110 transmits a response. The process 300 continues for as long as the vehicle 100 remains on.

The process 300 begins in a block 305, in which the master controller 110 receives the configuration file, as described above.

Next, in a block 310, the master controller 110 allocates the applications to the control modules 115 according to the default allocation from the configuration file, as described above. Because the process 300 begins on a key cycle, i.e., when the vehicle 100 is turned on, the allocation is reset back to the default allocation each time the vehicle 100 is turned off and back on.

Next, in a block 315, the master controller 110 transmits respective queries to the control modules 115 (including the backup master controller 125), as described above.

Next, in a decision block 320, the master controller 110 determines from the queries whether any control module 115 is subject to a new resource limitation, e.g., a previously available control module 115 is now unavailable or has reduced processing capacity, or a control module 115 that previously had reduced processing capacity is now unavailable. The master controller 110 may compare the status based on the queries as described above with the status reported in the resource map. Upon determining that at least one control module 115 has a new resource limitation, the process 300 proceeds to a block 325. If the resource map is unchanged, the process 300 proceeds to a decision block 340.

In the block 325, the master controller 110 update the resource map, e.g., the resource limitations listed in the map, based on the responses or lack of responses from the control modules 115, as described above.

Next, in a block 330, the master controller 110 identifies the applications affected by the new resource limitations, as described above.

Next, in a block 335, the master controller 110 puts the applications that are allocated to the control module 115 subject to the new resource limitation into the queue 206, as described above. After the block 335, the process 300 proceeds to the decision block 340.

In the decision block 340, the master controller 110 determines whether any applications are in the queue 206, as described above. If so, the process 300 proceeds to a block 345. If not, the process 300 proceeds to a decision block 380.

In the block 345, the master controller 110 selects a next application taken from the queue 206, e.g., in an order based on the priorities of the applications in the queue 206, as described above.

Next, in a block 350, the master controller 110 receives the dependencies and the constraints for the next application, as described above.

Next, in a block 355, the master controller 110 determines which control modules 115 are available based on the resource map.

Next, in a decision block 360, the master controller 110 determines whether any control modules 115 are available. If so, the process 300 proceeds to a decision block 365. If not, the process 300 returns to the block 355 to check for available control modules 115.

In the decision block 365, the master controller 110 determines whether any of the available control modules 115 fit the constraints of the application, i.e., are on a list of eligible control modules 115 for that application. If so, the process 300 proceeds to a block 370. If not, the process 300 returns to the block 355 to check for other available control modules 115.

In the block 370, the master controller 110 determines the control module 115 to which to allocate the application from the available control modules 115 that fit the constraints based on the dependencies, the resource limitations, and/or other factors, as described above.

Next, in a block 375, the master controller 110 allocates the application to the control module 115 selected in the block 370, as described above. After the block 375, the process 300 returns to the decision block 340.

In the decision block 380, the master controller 110 determines whether the master controller 110 has received a request to rejoin from a previously unavailable control module 115. The control modules 115 can be programmed to transmit a request to rejoin to the master controller 110 upon powering on, upon the vehicle 100 exiting the power-conservation mode, upon completing an update, etc. In response to receiving the request to rejoin, the process 300 proceeds to a block 385. If the master controller 110 has not received the request to rejoin, the process 300 proceeds to a decision block 390.

In the block 385, the master controller 110 updates the resource map according to the request to rejoin, e.g., changing the status of the control module 115 to available. After the block 385, the process 300 proceeds to the decision block 390.

In the decision block 390, the master controller 110 determines whether the master controller 110 has received a query from the backup master controller 125, as described above. If so, the process 300 proceeds to a block 395. If not, the process 300 proceeds to a decision block 399.

In the block 395, the master controller 110 transmits a response to the backup master controller 125, as described above. After the block 395, the process 300 proceeds to the decision block 399.

In the decision block 399, the master controller 110 determines whether the vehicle 100 is still on. If so, the process 300 returns to the block 315 to check the statuses of the control modules 115. If not, the process 300 ends.

Figure 4:
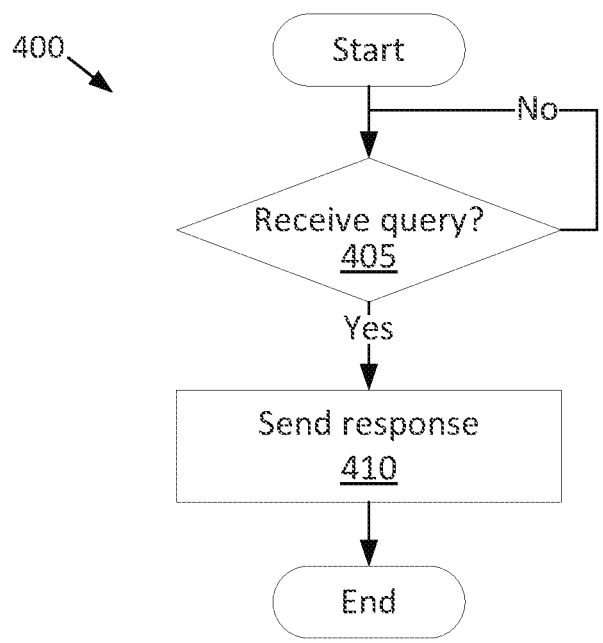
FIG. 4 is an example process for one of the control modules to report a status.

FIG. 4 is a process flow diagram illustrating an example process 400 for one of the control modules 115 to report a status. The memory of the control module 115 stores executable instructions for performing the steps of the process 400 and/or programming can be implemented in structures such as mentioned above. As a general overview of the process 400, the control module 115 determines whether the control module 115 has received a query from the master controller 110. If so, the control module 115 sends the response.

The process 400 begins in a decision block 405, in which the control module 115 determines whether the control module 115 has received a query from the master controller 110, transmitted as described above with respect to the block 315. In response to receiving the query, the process 400 proceeds to a block 410. If the control module 115 has not received the query, the process 400 remains at the decision block 405 to wait for the query.

In the block 410, the control module 115 transmits the response to the master controller 110, as described above. After the block 410, the process 400 ends.

Figure 5:
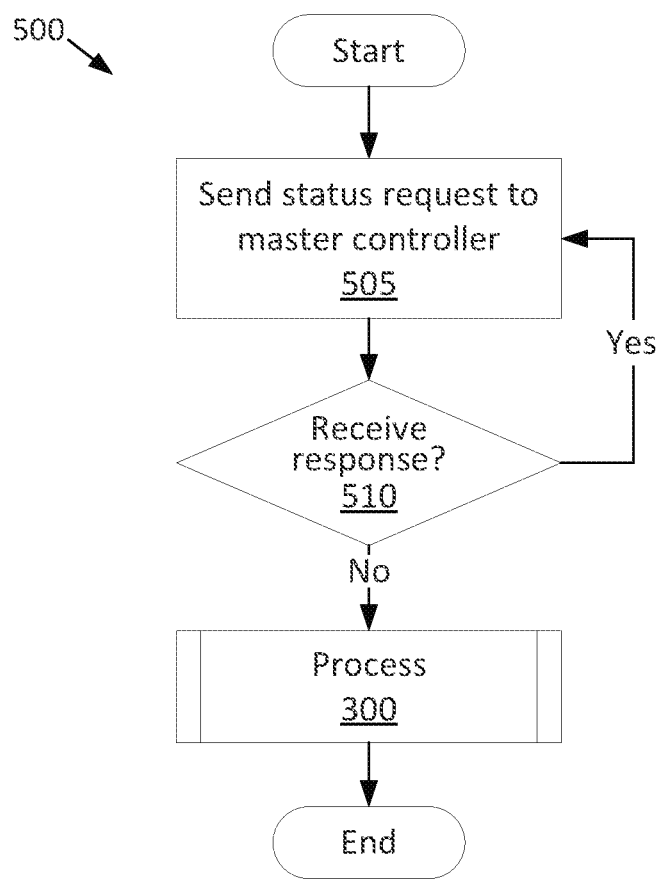
FIG. 5 is a process for a backup master controller of the vehicle to take over for the master controller.

FIG. 5 is a process flow diagram illustrating an example process 500 for the backup master controller 125 to take over for the master controller 110. The memory of the backup master controller 125 stores executable instructions for performing the steps of the process 500 and/or programming can be implemented in structures such as mentioned above. As a general overview of the process 500, the backup master controller 125 transmits a query to the master controller 110. Upon failing to receive a response to the query, the backup master controller 125 performs the process 300. As noted above, the backup master controller 125 may be one of the control modules 115, so the backup master controller 125 may simultaneously perform the process 400 above.

The process 500 begins in a block 505, in which the backup master controller 125 transmits the query to the master controller 110, as described above. Transmitting the query may be performed at periodic intervals.

Next, in a decision block 510, the backup master controller 125 determines whether the master controller 110 is available, as described above. Upon determining that the master controller 110 is unavailable, the process 500 proceeds to the process 300. If the backup master controller 125 is available, the process 500 returns to the block 505 to transmit the query at the next period.

In the process 300, the backup master controller 125 performs the process 300 described above in place of the master controller 110, as described above. After the process 300, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle system comprising:
a master controller;
a plurality of control modules; and
a vehicle network communicatively coupling the master controller and the control modules on board a vehicle;
wherein the master controller is programmed to:
  receive a default allocation of a plurality of applications to the control modules from a server remote from the vehicle;
  allocate the applications to the control modules according to the default allocation;
  receive a set of dependencies between the applications;
  receive resource limitations for the control modules; and allocate the applications to the control modules based on the dependencies and the resource limitations; and each control module is programmed to, upon allocation of at least one of the applications to the control module, execute the at least one application allocated thereto to control features of the vehicle.

2. The vehicle system of claim 1, further comprising a backup master controller, wherein the backup master controller is programmed to, upon determining that the master controller is unavailable, determine the set of the dependencies between the applications, receive the resource limitations for the control modules, and allocate the applications to the control modules based on the dependencies and the resource limitations.

3. The vehicle system of claim 1, wherein the control modules include a first control module, and the first control module is programmed to, upon determining that the master controller is unavailable, determine the set of the dependencies between the applications, receive the resource limitations for the control modules, and allocate the applications to the control modules based on the dependencies and the resource limitations.

4. The vehicle system of claim 1, wherein the master controller is further programmed to transmit respective queries to the control modules, and the control modules are programmed to transmit respective responses in response to receiving the respective queries.

5. The vehicle system of claim 4, wherein the master controller is further programmed to update the resource limitations based on the responses from the control modules.

6. A computer comprising a processor and a memory, the memory storing instructions executable to:
receive a default allocation of a plurality of applications to a plurality of control modules on board a vehicle from a server remote from the vehicle;
allocate the applications to the control modules according to the default allocation;
receive a set of dependencies between the applications;
receive resource limitations for the control modules on board the vehicle; and
allocate the applications to the control modules based on the dependencies and the resource limitations;
wherein, upon allocation of the applications to the control modules, the control modules execute the applications allocated thereto to control features of the vehicle.

7. The computer of claim 6, wherein, when allocating the applications to the control modules, the applications are taken from a queue.

8. The computer of claim 7, wherein the instructions further include instructions to, upon determining that a first control module of the control modules is unavailable, put the applications that are allocated to the first control module into the queue.

9. The computer of claim 8, wherein the instructions further include instructions to determine that the first control module is unavailable based on the first control module being offline.

10. The computer of claim 8, wherein the instructions further include instructions to determine that the first control module is unavailable based on the first control module currently receiving an update.

11. The computer of claim 8, wherein the instructions further include instructions to determine that the first control module is unavailable based on the vehicle entering a power-conservation state.

12. The computer of claim 7, wherein the applications in the queue have respective priorities, and allocating the applications to the control modules is performed in an order based on the priorities.

13. The computer of claim 6, wherein the applications include a first application and a second application, the set of dependencies includes that the first application is dependent on the second application, and allocating the applications includes allocating the first application and the second application to a same control module of the control modules.

14. The computer of claim 6, wherein the instructions further include instructions to, upon determining that a first control module of the control modules is unavailable, update the resource limitations.

15. The computer of claim 14, wherein the instructions further include instructions to transmit respective queries to the control modules, and to determine that the first control module is unavailable based on the queries.

16. The computer of claim 6, wherein the applications are containerized.

17. The computer of claim 6, wherein receiving the set of the dependencies includes receiving the set of the dependencies from the server remote from the vehicle.

18. The computer of claim 6, wherein allocating the applications to the control modules based on the dependencies and the resource limitations includes allocating the applications differently than the default allocation.

19. A method comprising:
receiving a default allocation of a plurality of applications to a plurality of control modules on board a vehicle from a server remote from the vehicle;
allocating the applications to the control modules according to the default allocation;
receiving a set of dependencies between the applications;
receiving resource limitations for the control modules on board the vehicle;
allocating the applications to the control modules based on the dependencies and the resource limitations; and
upon allocation of the applications to the control modules, executing, by the control modules, the applications allocated thereto to control features of the vehicle.

* * * * *